(12) United States Patent
Ono et al.

(10) Patent No.: US 9,871,957 B2
(45) Date of Patent: Jan. 16, 2018

(54) ENVIRONMENT RECOGNITION UNIT AND ROBOT

(71) Applicant: HONDA MOTOR CO., LTD., Tokyo (JP)

(72) Inventors: Hiroaki Ono, Saitama (JP); Yasuhiro Yamasaki, Saitama (JP); Ryuma Ujino, Saitama (JP); Minami Asatani, Saitama (JP)

(73) Assignee: HONDA MOTOR CO., LTD, Tokyo (JP)

( * ) Notice: Subject to any disclaimer, the term of this patent is extended or adjusted under 35 U.S.C. 154(b) by 44 days.

(21) Appl. No.: 15/042,409

(22) Filed: Feb. 12, 2016

(65) Prior Publication Data
US 2016/0241762 A1 Aug. 18, 2016

(30) Foreign Application Priority Data
Feb. 17, 2015 (JP) ................. 2015-028967

(51) Int. Cl.
| | |
|---|---|
| G05B 15/00 | (2006.01) |
| H04N 5/225 | (2006.01) |
| H04N 5/232 | (2006.01) |
| G06K 9/00 | (2006.01) |
| H04N 7/18 | (2006.01) |
| G01S 17/88 | (2006.01) |
| G01B 11/02 | (2006.01) |
| G01B 11/25 | (2006.01) |
| G05B 19/00 | (2006.01) |

(52) U.S. Cl.
CPC ......... *H04N 5/2257* (2013.01); *G01B 11/026* (2013.01); *G01B 11/25* (2013.01); *G01S 17/88* (2013.01); *G06K 9/00664* (2013.01); *H04N 5/232* (2013.01); *H04N 7/181* (2013.01); *H04N 7/185* (2013.01); *Y10S 901/01* (2013.01)

(58) Field of Classification Search
CPC .. G01B 11/24; G06K 9/00664; H04N 5/2257; H04N 5/232; H04N 7/181; H04N 7/185; Y10S 901/01
USPC ........................................................ 700/259
See application file for complete search history.

(56) References Cited

U.S. PATENT DOCUMENTS

| | | | | |
|---|---|---|---|---|
| 3,306,975 A | * | 2/1967 | Donnay | H01J 7/24 313/12 |
| 4,218,989 A | * | 8/1980 | Fujita | F27D 1/1642 118/317 |
| 5,014,183 A | * | 5/1991 | Carpenter | G05B 19/425 318/568.19 |
| 5,162,906 A | * | 11/1992 | Yorita | F27D 21/02 348/83 |
| 5,715,328 A | * | 2/1998 | Tsukihara | C10B 45/00 348/83 |
| 7,347,120 B2 | * | 3/2008 | Friedrich | B25J 9/044 414/744.5 |

(Continued)

FOREIGN PATENT DOCUMENTS

JP 2011-212818 10/2011

*Primary Examiner* — Harry Y Oh
(74) *Attorney, Agent, or Firm* — Rankin, Hill & Clark LLP

(57) ABSTRACT

An environment recognition unit (20*a*) includes a frame (201), cameras (202) arranged on a front side in the frame (201), a camera control circuit (207) disposed on a back side in the frame (201), a pair of LRFs (205) arranged laterally to the frame (201). The frame (201) includes a first duct (208) provided adjacent to the camera control circuit (207), and a second duct (210) provided adjacent to the cameras (202).

10 Claims, 12 Drawing Sheets

(56) References Cited

U.S. PATENT DOCUMENTS

| | | | |
|---|---|---|---|
| 7,839,450 B2* | 11/2010 | Hing | G01J 3/02 348/229.1 |
| 8,233,040 B2* | 7/2012 | Patel | G06K 7/10 348/61 |
| 9,618,733 B2* | 4/2017 | Swihart | G02B 15/14 |
| 9,643,319 B2* | 5/2017 | Ono | B25J 9/1697 |
| 2005/0179899 A1* | 8/2005 | Palti-Wasserman | G01N 21/3504 356/417 |
| 2006/0097176 A1* | 5/2006 | Szu | A61B 5/0059 250/370.08 |
| 2007/0125962 A1* | 6/2007 | Okabe | H01L 21/67109 250/492.1 |
| 2010/0283883 A1* | 11/2010 | Sato | G02B 27/283 348/335 |
| 2013/0017128 A1* | 1/2013 | Silbert | G01N 35/0099 422/509 |
| 2013/0112440 A1* | 5/2013 | Alsaif | A62C 27/00 169/46 |
| 2013/0258188 A1* | 10/2013 | Park | H04N 5/2251 348/374 |
| 2013/0310972 A1* | 11/2013 | Shoffner | B25J 9/1679 700/245 |
| 2014/0055623 A1* | 2/2014 | Okada | H04N 5/232 348/177 |
| 2015/0029595 A1* | 1/2015 | Swihart | G02B 15/14 359/683 |
| 2016/0080663 A1* | 3/2016 | Kelley | H04N 5/28 701/19 |
| 2016/0105592 A1* | 4/2016 | Dispenza | H04N 5/2252 348/373 |
| 2016/0236350 A1* | 8/2016 | Ono | B25J 9/1697 |

* cited by examiner

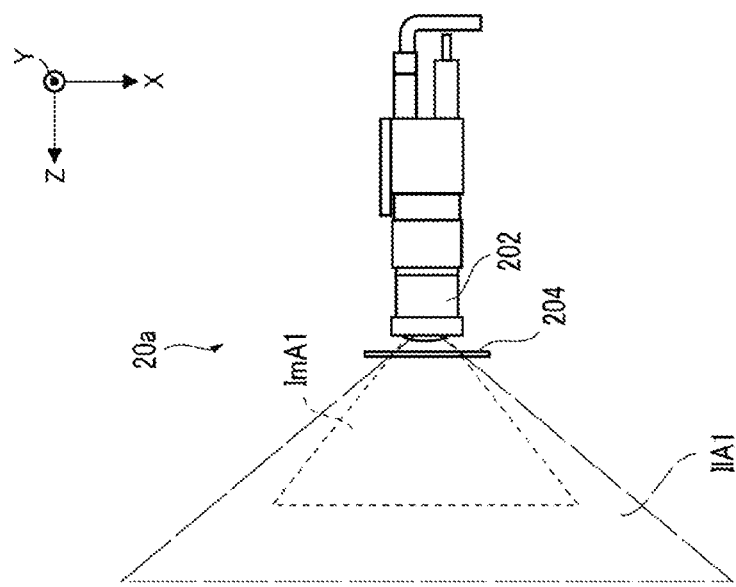
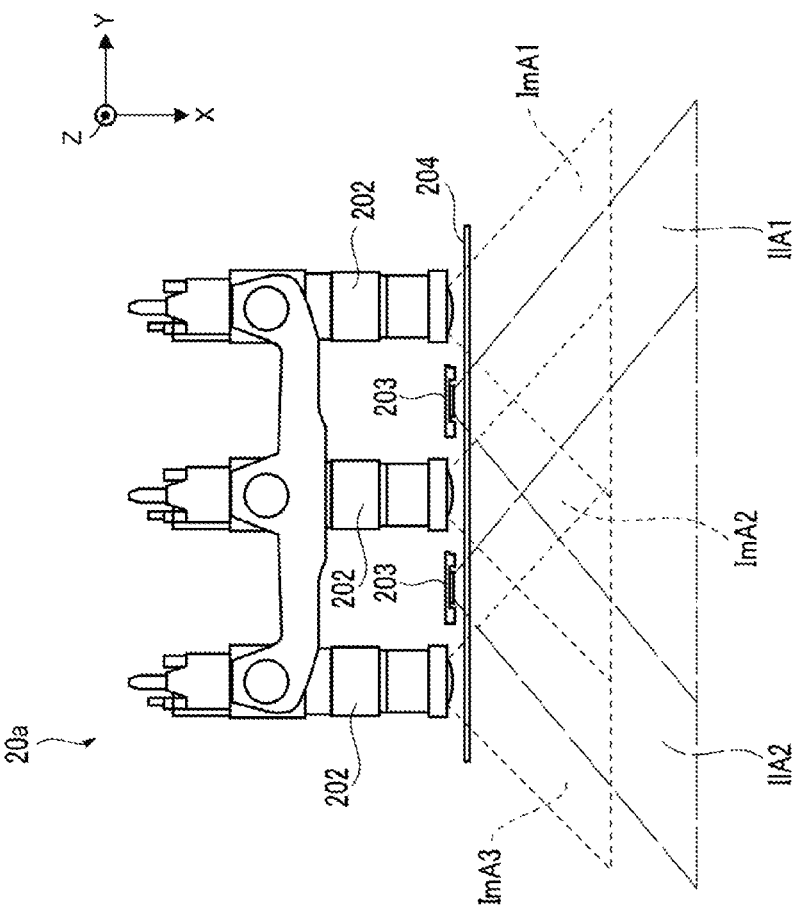

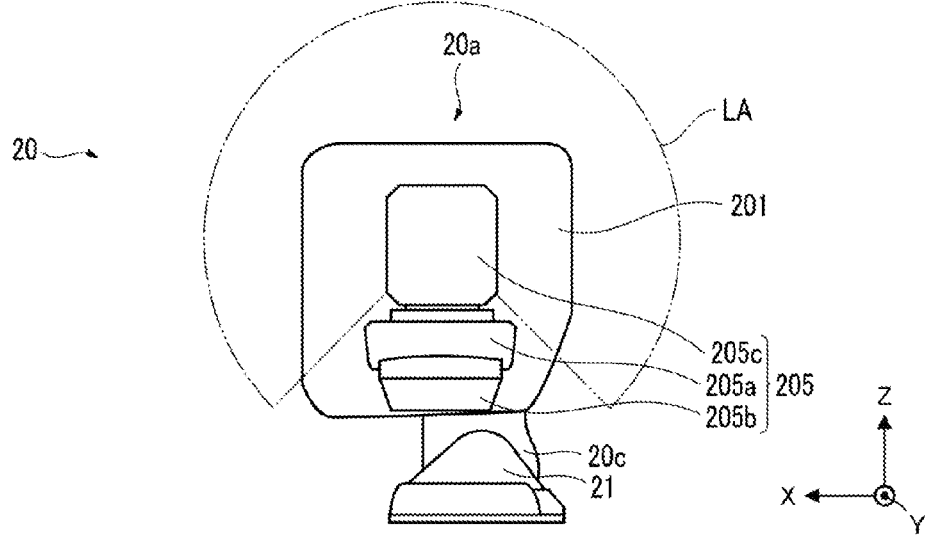
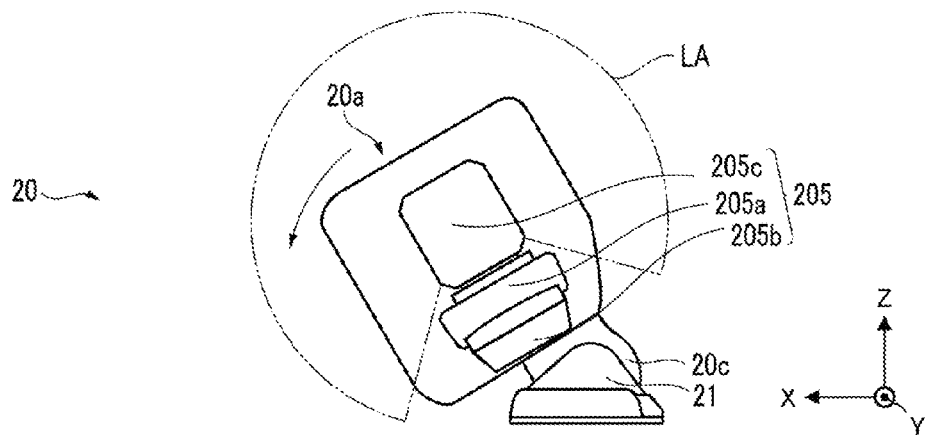
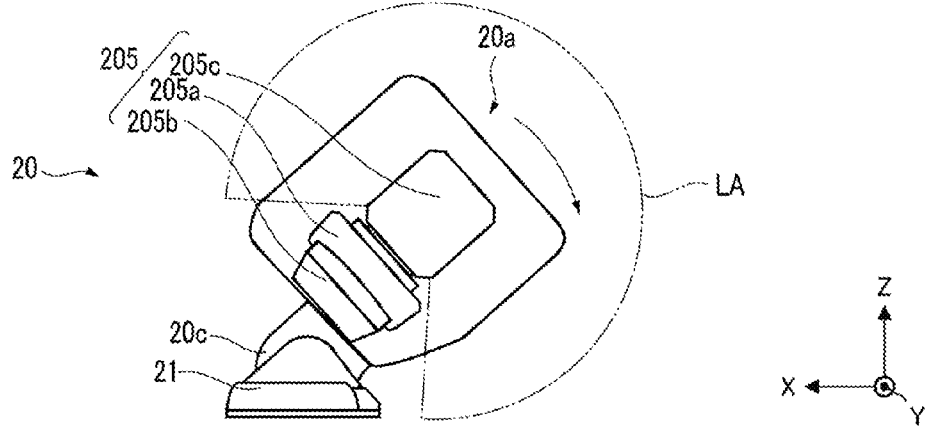

ENVIRONMENT RECOGNITION UNIT AND ROBOT

BACKGROUND OF THE INVENTION

Field of the Invention

The present invention relates to an environment recognition unit configured to recognize ambient environment and to a robot.

Description of the Related Art

Conventionally, there is a robot including, as in a human, a base serving as a body, a head provided at an upper portion of the base, arms extending from the base, and hands each provided as an end effector at a corresponding one of tip end portions of the arms.

A robot configured such that an environment recognition unit using a distance sensor such as a laser range finder (hereinafter referred to as an "LRF") is disposed at a head in order to recognize environment in an area where a task(s) is performed using end effectors has been known as the robot of this type (see, e.g., Japanese Patent Laid-Open No. 2011-212818).

In the case where a human operates the conventional robot to perform a task(s) using the end effectors of the robot, it has been demanded that not only the distance sensor such as the LRF but also a camera are mounted on the environment recognition unit to sufficiently recognize environment in the working area.

However, in the case of mounting the camera, a satisfactory cooling function is required for the environment recognition unit in order to cool the camera.

The conventional robot is not configured considering waterproofing from rainwater etc. For this reason, in order to enhance waterproof properties, the method of enhancing frame airtightness in an entire environment recognition unit or the method of covering, with a cover, the entirety of a robot using an environment recognition unit may be employed.

However, in the case of using such waterproofing methods, a conventional cooling method of causing external air to pass through a clearance in the frame cannot be employed. As a result, a cooling mechanism needs to be disposed in the frame, and this may lead to an increase in device size.

The present invention has been made in view of the above-described points, and provides a compact small type environment recognition unit having a satisfactory cooling function and high waterproofing and a robot using the environment recognition unit.

SUMMARY OF THE INVENTION

In order to accomplish the above-described goal, an environment recognition unit of the present invention includes a frame; a camera disposed at a forward side in the frame and configured to image the forward of the frame; a control circuit disposed at a backward side than the camera in the frame and configured to control the camera; a pair of distance sensors arranged at side of to the frame; a first cooling mechanism provided adjacent to the control circuit at the backward side in the frame; and a second cooling mechanism provided adjacent to the camera at the forward side in the frame.

As described above, the camera images the forward of the frame, and the pair of distance sensors recognize environment around the environment recognition unit. With this configuration, environment in a working area and a peripheral area can be sufficiently recognized without great movement of the environment recognition unit. That is, in the environment recognition unit of the present invention having such a configuration, a rotary shaft and a drive mechanism of the environment recognition unit can be downsized.

Moreover, two cooling mechanisms separately arranged apart from each other to cool the camera and the control circuit for the camera are employed. With this configuration, the environment recognition unit of the present invention has higher waterproofing and an easily-compactified structure with a higher degree of freedom in arrangement of internal equipment as compared to a unit employing a cooling method using air passing through a clearance in the frame.

Thus, the environment recognition unit of the present invention is compact while exhibiting a satisfactory cooling function and high waterproofing.

Note that the cooling mechanism may be a mechanism which can be disposed in the inner space of the frame, such as a duct through which external air passes or a radiator and a pipe which is connected to the radiator and through which liquid flows.

Moreover, the environment recognition unit of the present invention preferably further includes a light source configured to illuminate the forward of the frame. The light source is preferably disposed adjacent to the second cooling mechanism in the forward side of the second cooling mechanism in the frame.

In the case of providing the light source at the environment recognition unit, the light source is disposed as described above so that a recognizable area of the camera can be sufficiently illuminated and that the light source can be efficiently cooled.

Further, in the environment recognition unit of the present invention, the first or second cooling mechanism is preferably a duct, and at least one of openings of the duct is preferably positioned on a lower side or the backward side in the frame.

In the case of using the duct as the second cooling mechanism, such a duct is disposed as described above so that it can become difficult for water to flow into the duct, leading to much higher waterproofing.

In addition, in the environment recognition unit of the present invention, the first or second cooling mechanism is preferably a duct, and a sealing mechanism is preferably attached between an opening of the duct and the frame.

This sealing mechanism leads to much higher waterproofing.

Moreover, the environment recognition unit of the present invention preferably further includes a distance sensor control circuit disposed in the frame and configured to control operation of the distance sensors. Each distance sensor preferably includes a hollow support extending laterally from the frame, a driver attached to a lower or upper portion of a tip end portion of the support, a measurer attached to a portion of the support opposite to the driver to rotate about a yaw axis, and a distance sensor harness electrically connecting the driver or the measurer to the distance sensor control circuit. The distance sensor harness preferably extends into the frame through the inside of the support.

With this configuration, a hole opening of the inner space of the support, in which the distance sensor harness passes, on the side close to the frame is along the horizontal direction. This prevents water from entering the frame through the opening, and prevents lowering of waterproof properties.

Further, in order to accomplish the above-described goal, a robot of the present invention includes a base; an environment recognition unit; and a coupling mechanism configured to rotatably couple the environment recognition unit to the base. The environment recognition unit includes a frame, a camera disposed at a forward side in the frame and configured to image forward of the frame, a control circuit disposed at a backward side than of the camera in the frame and configured to control the camera, a pair of distance sensors arranged at side of the frame, a first cooling mechanism provided adjacent to the control circuit at the backward side in the frame, and a second cooling mechanism provided adjacent to the camera at the forward side in the frame.

As described above, the above-described environment recognition unit is applicable to the robot. Particularly in the case of a bipedal robot imitating the form of a human, the environment recognition unit serves as a head of the robot, and the coupling mechanism serves as a neck join mechanism.

In addition, in the robot of the present invention, the environment recognition unit is preferably disposed above the base, and the coupling mechanism preferably couples the environment recognition unit and the base together such that the environment recognition unit is rotatable about a pitch axis or a roll axis relative to the base.

With this configuration, it is difficult for water to enter the base along the axis (pitch or roll axis) parallel to the surface of the base, leading to much higher waterproofing.

Moreover, the robot of the present invention preferably further includes a plurality of movable links; and a plurality of joint mechanisms each coupled such that a corresponding one of the movable links is rotatable relative to the base. The plurality of movable links preferably include a pair of right and left arm links provided at an upper portion of the base, and a pair of right and left leg links provided at a lower portion of the base. The robot is preferably switchable between a two-legged walking mode using only the leg links or the arm links and a four-legged walking mode using the leg links and the arm links. The coupling mechanism preferably couples the environment recognition unit and the base together such that the environment recognition unit is rotatable about the pitch axis or the roll axis relative to the base.

As described above, in the case of the robot capable of switching between the two-legged walking mode and the four-legged walking mode, the surface positioned on the upper side of the base in the two-legged walking mode is on the front side of the base in the four-legged walking mode.

As long as the environment recognition unit is rotatable about the pitch axis or the roll axis, a rotation axis is parallel to the surface of the base in any mode. Thus, waterproof properties are not lowered.

BRIEF DESCRIPTION OF THE DRAWINGS

FIG. 5A illustrates the case of not rotating LRFs. FIG. 5B illustrates the case of rotating the LRFs;

FIGS. 6A and 6B are views illustrating imaging areas of cameras and irradiation areas of lights in the robot of FIG. 1. FIG. 6A is a plan view. FIG. 6B is a side view;

FIG. 7A illustrates the case of not rotating measurers of the LRFs. FIG. 7B illustrates the case of rotating the measurers backward. FIG. 7C illustrates the case of rotating the measurers forward;

FIGS. 8A to 8C are side views of the environment recognition unit and the neck joint mechanism of the robot of FIG. 1. FIG. 8A illustrates the case where the environment recognition unit is in a reference posture. FIG. 8B illustrates the case where the environment recognition unit inclines forward. FIG. 8C illustrates the case where the environment recognition unit inclines backward;

DETAILED DESCRIPTION OF THE REFERRED EMBODIMENTS

An embodiment of a robot of the present invention will be described with reference to drawings. A robot 1 of the present embodiment is a humanoid robot, and is configured to move by switching between a two-legged walking mode and a four-legged walking mode.

Note that the robot of the present invention is not limited to the humanoid robot configured as described above, and includes different forms of robots, such as other industrial robots, from that of the robot 1 of the present embodiment as long as these robots each include a base, a coupling mechanism, and an environment recognition unit coupled to the base via the coupling mechanism.

Figure 1:
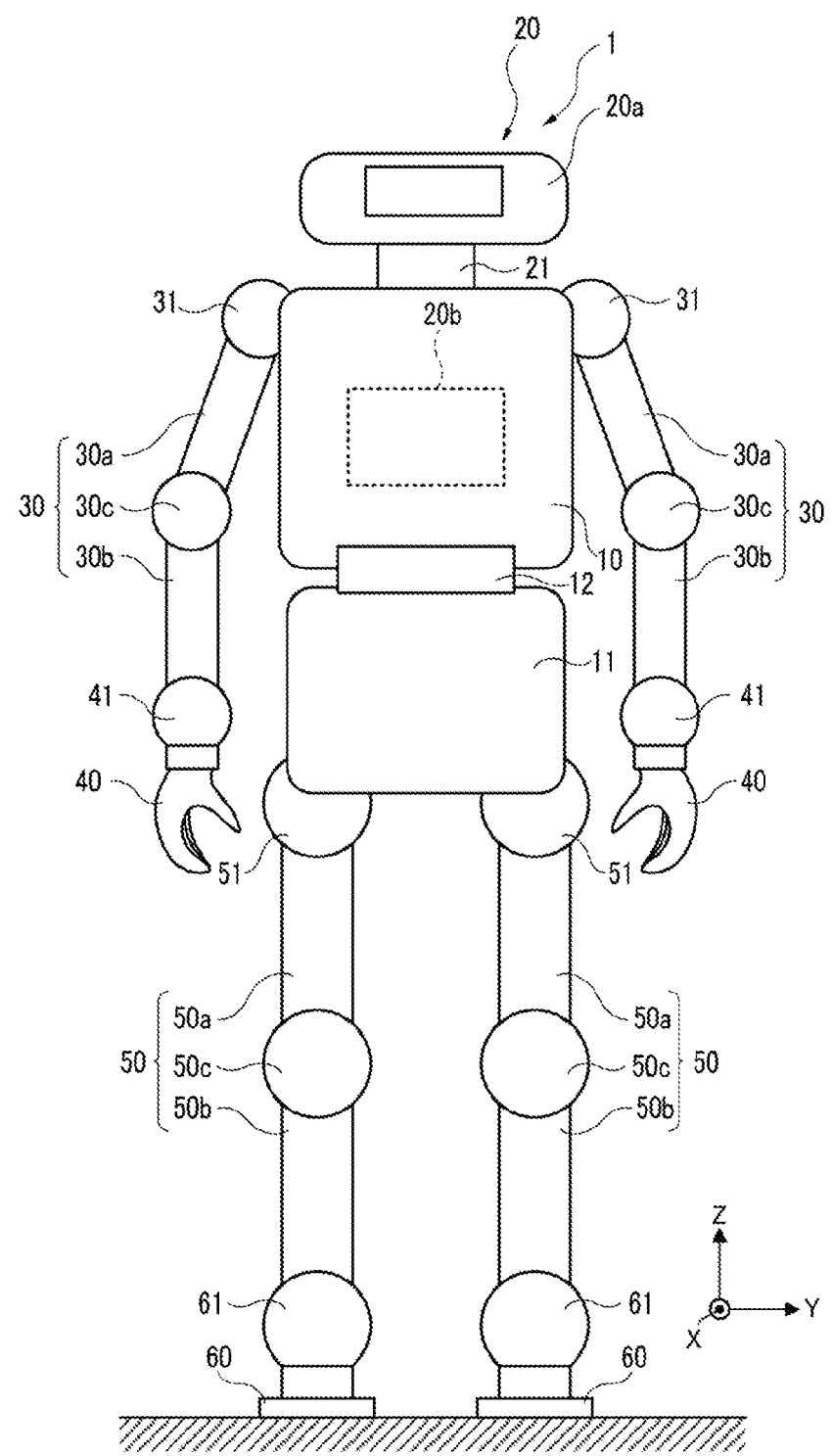
FIG. 1 is a front view schematically illustrating the configuration of a robot of an embodiment of the present invention.

First, the configuration of the robot 1 of the present embodiment will be described with reference to FIG. 1.

A body of the robot 1 includes an upper base 10, a lower base 11 disposed below the upper base 10, and a waist joint mechanism 12 provided between the upper base 10 and the lower base 11. The upper base 10 and the lower base 11 are coupled together via the waist joint mechanism 12 corresponding to the waist joint of a human, to rotate relative to each other.

A head of the robot 1 is an environment recognition unit 20a of an environment recognition device 20 configured to recognize ambient environment. The environment recognition unit 20a is rotatably coupled to the upper base 10 via a neck joint mechanism (coupling mechanism) 21 corresponding to the neck joint of a human.

As will be described later, cameras for imaging external environment or sensors for recognizing the distance to external environment are mounted on the environment recognition unit 20a. The cameras and the sensors are controlled by an environment recognition unit control circuit 20b disposed in the upper base 10 and a later-described control circuit disposed in the environment recognition unit 20a.

Since the robot 1 of the present embodiment is the humanoid robot, the environment recognition unit 20a corresponding to the head of a human is provided above the upper base 10. However, the environment recognition unit of the robot of the present invention is not limited to such a configuration. Depending on, e.g., usage environment of the robot, the environment recognition unit of the robot of the present invention may be provided at a position (e.g., a front portion of the upper base) other than the position above the upper base.

Right and left arms of the robot 1 are a pair of arm links (movable links) 30 extending respectively from upper right and left sides of the upper base 10. Each arm link 30 is rotatably coupled to the upper base 10 via a shoulder joint mechanism 31 corresponding to the shoulder joint of a human.

Each arm link 30 includes a first arm link portion 30a corresponding to the upper arm of a human, a second arm link portion 30b corresponding to the front arm of a human, and an elbow joint mechanism 30c corresponding to the elbow joint of a human.

The first arm link portion 30a is rotatably coupled to the upper base 10 via the shoulder joint mechanism 31. The second arm link portion 30b is rotatably coupled to the first arm link portion 30a via the elbow joint mechanism 30c. A hand 40 corresponding to the hand of a human is coupled to a tip end of the second arm link portion 30b.

Note that in the robot 1 of the present embodiment, each arm link 30 serving as the arm includes the first arm link portion 30a, the second arm link portion 30b, and the elbow joint mechanism 30c. However, the arm of the robot of the present invention is not limited to such a configuration, and may include a single link portion or include three or more link portions and a plurality of joint portions coupling the link portions together.

The hand 40 is an example of an end effector. The hand 40 is rotatably coupled to the second arm link portion 30b of the arm links 30 via a wrist joint mechanism 41 corresponding to the wrist joint of a human. In the robot 1 of the present embodiment, the hand 40 and the arm link 30 form a robot arm serving as a manipulator.

Right and left legs of the robot 1 are a pair of right and left leg links 50 extending downwardly from a lower portion of the lower base 11. Each leg link 50 is rotatably coupled to the lower base 11 via a hip joint mechanism 51 corresponding to the hip joint of a human.

Each leg link (movable link) 50 includes a first leg link portion 50a corresponding to the thigh of a human, a second leg link portion 50b corresponding to the lower thigh of a human, and a knee joint mechanism 50c corresponding to the knee joint of a human.

The first leg link portion 50a is rotatable coupled to the lower base 11 via the hip joint mechanism 51. The second leg link portion 50b is rotatably coupled to the first leg link portion 50a via the knee joint mechanism 50c. A foot 60 corresponding to the foot of a human is coupled to a tip end of the second leg link portion 50b.

Note that in the robot 1 of the present embodiment, each leg link 50 serving as the leg includes the first leg link portion 50a, the second leg link portion 50b, and the knee joint mechanism 50c. However, the leg of the robot of the present invention is not limited to such a configuration, and may include a single link portion or include three or more link portions and a plurality of joint portions coupling the link portions together.

The foot 60 is rotatably coupled to the second leg link portion 50b of the leg link 50 via an ankle joint mechanism 61 corresponding to the ankle joint of a human.

Next, the degree of freedom of each joint mechanism of the robot 1 of the present embodiment will be described with reference to FIG. 2.

Unless otherwise provided, the direction of rotation of each member by each joint mechanism will be, in the present embodiment, described based on a posture (hereinafter referred to as a "reference posture") when any of the joint mechanisms do not rotate the members coupled thereto. In the case of the robot 1 of the present embodiment, the reference posture is the state when the robot 1 stands upright (the state in which the upper base 10, the lower base 11, the arm links 30, and the leg links 50 extend substantially in the vertical direction).

Figure 2:
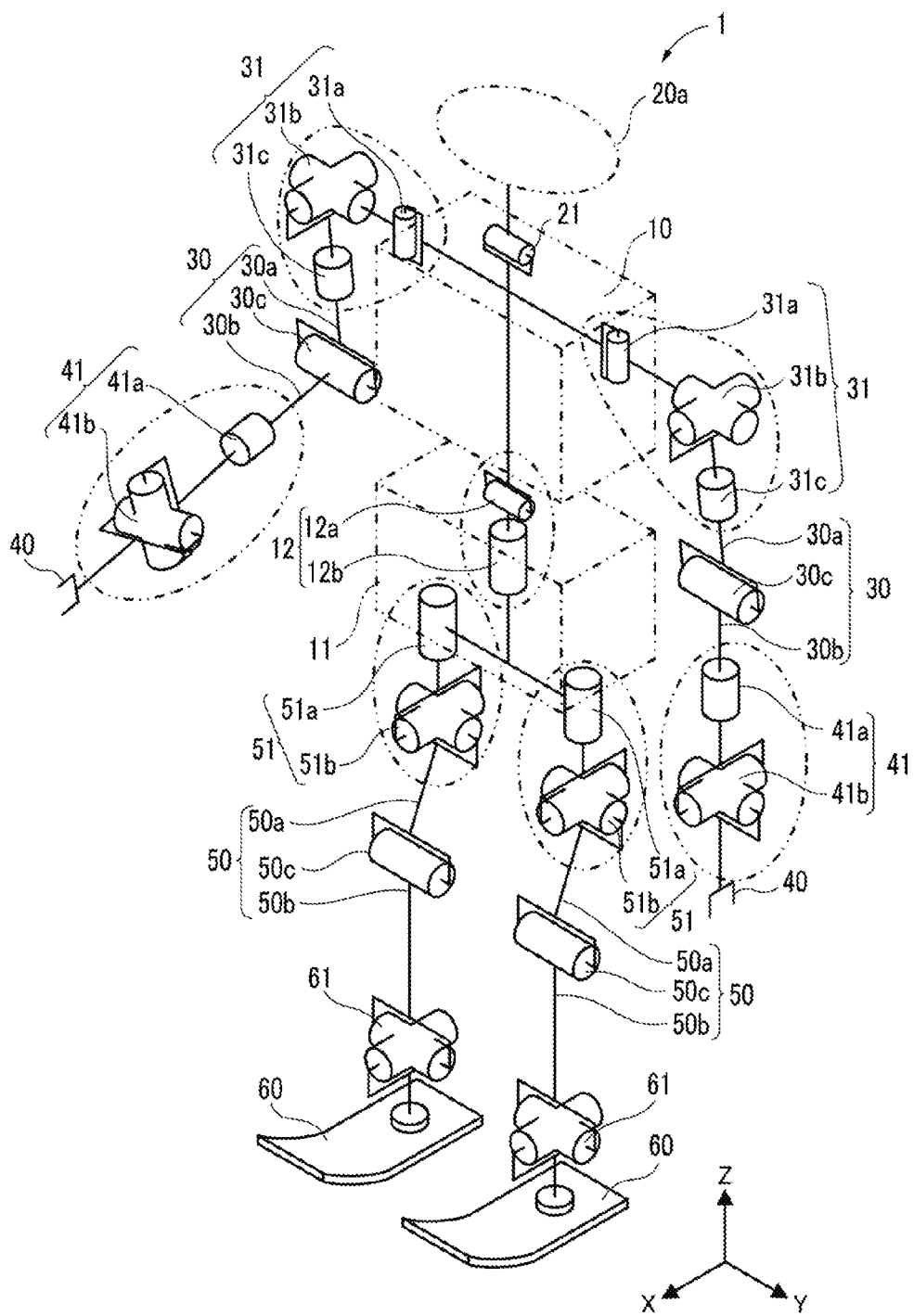
FIG. 2 is a perspective view schematically illustrating the degree of freedom of each joint mechanism of a robot of FIG. 1.

Moreover, in the description of the present embodiment, a yaw axis, a pitch axis, and a roll axis respectively indicate, as illustrated in FIG. 2, the vertical axis (Z-axis), the right-left axis (Y-axis), and the front-back axis (X-axis) of the robot 1 when the robot 1 is in the reference posture. In this case, the yaw axis is the body trunk axis of the upper base 10 and the lower base 11.

The waist joint mechanism 12 includes a first waist joint mechanism 12a disposed below the upper base 10, and a second waist joint mechanism 12b disposed between the first waist joint mechanism 12a and the lower base 11.

The first waist joint mechanism 12a is coupled such that the upper base 10 is rotatable about the pitch axis relative to the lower base 11 and the second waist joint mechanism 12b. The second waist joint mechanism 12b is coupled such that the upper base 10 and the first waist joint mechanism 12a are rotatable about the yaw axis relative to the lower base 11.

The neck joint mechanism 21 is coupled such that the environment recognition unit 20a is rotatable about the pitch axis relative to the upper base 10.

The elbow joint mechanism 30c of each arm link 30 is coupled such that the second arm link portion 30b corresponding to the front arm of a human is rotatable about the pitch axis relative to the first arm link portion 30a corresponding to the upper arm of a human.

Each shoulder joint mechanism 31 includes a first shoulder joint mechanism 31a disposed within the range of the vertical and horizontal widths of the upper base 10, a second shoulder joint mechanism 31b disposed laterally to the first shoulder joint mechanism 31a outside the upper base 10, and a third shoulder joint mechanism 31c disposed between the second shoulder joint mechanism 31b and the first arm link portion 30a of the arm link 30.

The "width" of the base used herein indicates the width between the highest position and the lowest position of the base in the vertical direction in a normal usage state. Similarly, the "width" indicates the width between the foremost position and the rearmost position of the base or between the rightmost position and the leftmost position of the base in the horizontal direction in the normal usage state.

The first shoulder joint mechanism 31a is coupled such that the second shoulder joint mechanism 31b is rotatable about the yaw axis relative to the upper base 10. The second shoulder joint mechanism 31b is coupled such that the third shoulder joint mechanism 31c is rotatable about the pitch axis and the roll axis relative to the first shoulder joint mechanism 31a. The third shoulder joint mechanism 31c is coupled such that the arm link 30 is rotatable about the yaw axis relative to the second shoulder joint mechanism 31b.

Each wrist joint mechanism 41 includes a first wrist joint mechanism 41a disposed on the side close to the hand 40 relative to the second arm link portion 30b of the arm link 30, and a second wrist joint mechanism 41b disposed between the first wrist joint mechanism 41a and the hand 40.

The first wrist joint mechanism 41a is coupled such that the second wrist joint mechanism 41b is rotatable about the yaw axis relative to the second arm link portion 30b. The second wrist joint mechanism 41b is coupled such that the hand 40 is rotatable about the roll axis and the pitch axis relative to the first wrist joint mechanism 41a.

The knee joint mechanism 50c of each leg link 50 is coupled such that the second leg link portion 50b corresponding to the lower limb of a human is rotatable about the pitch axis relative to the first leg link portion 50a corresponding to the thigh of a human.

The hip joint mechanism 51 includes a first hip joint mechanism 51a disposed below the lower base 11, and a second hip joint mechanism 51b disposed on the side close to the leg link 50 relative to the first hip joint mechanism 51a.

The first hip joint mechanism 51a is coupled such that the second hip joint mechanism 51b is rotatable about the yaw axis relative to the lower base 11. The second hip joint mechanism 51b is coupled such that the leg link 50 is rotatable about the pitch axis and the roll axis relative to the first hip joint mechanism 51a.

Each ankle joint mechanism 61 is coupled such that the foot 60 is rotatable about the pitch axis and the roll axis relative to the second leg link portion 50b.

Note that the configurations of the waist joint mechanism, the shoulder joint mechanism, the elbow joint mechanism, the wrist joint mechanism, the knee joint mechanism, the hip joint mechanism, and the ankle joint mechanism in the robot of the present invention are not limited to the above-described configurations. These configurations may be optionally changeable depending on an intended use of the robot and a joint arrangement space in the robot. For example, any of the join mechanisms may be omitted, or a joint mechanism(s) other than the above-described joint mechanisms may be added.

Next, the two walking modes of the robot 1 of the present embodiment will be described with reference to FIGS. 3 and 4. Note that in FIG. 3, the arm links 30 are not shown for the sake of easy understanding.

Note that in the description of the present embodiment, "landing" of the hands 40 or the feet 60 means that the hands 40 or the feet 60 come into contact with external environment such that the hands 40 or the feet 60 receive contact reactive force against force acting on the robot 1.

Figure 3:
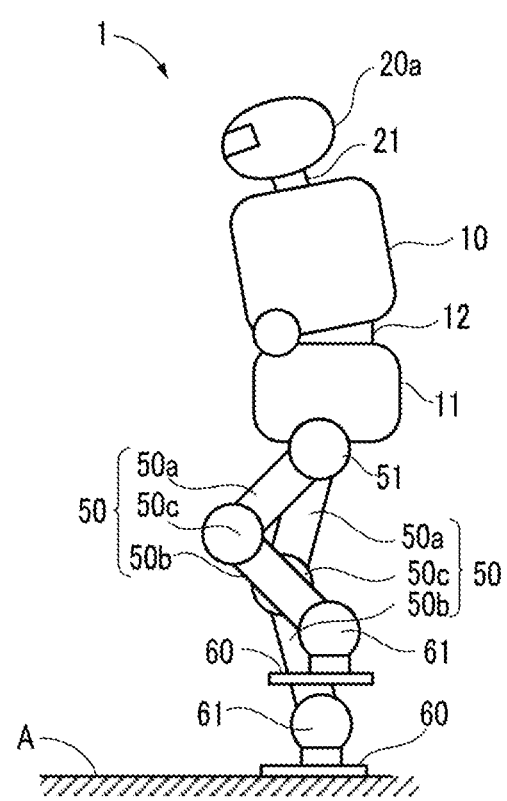
FIG. 3 is a side view illustrating the state in which the robot of FIG. 1 moves in a two-legged walking mode.

As illustrated in FIG. 3, in the two-legged walking mode, the following process is repeated: while the foot 60 at the tip end of one of the pair of leg links 50 is landed on the ground A (one of the leg links 50 is used as a support leg), the foot 60 at the tip end of the other leg link 50 moves in the air and then, is landed (the other leg link 50 operates as an idling leg). In this case, the leg links 50 alternately operate as the idling leg. Moreover, the not-shown arm links 30 is in a non-landed state.

Figure 4:
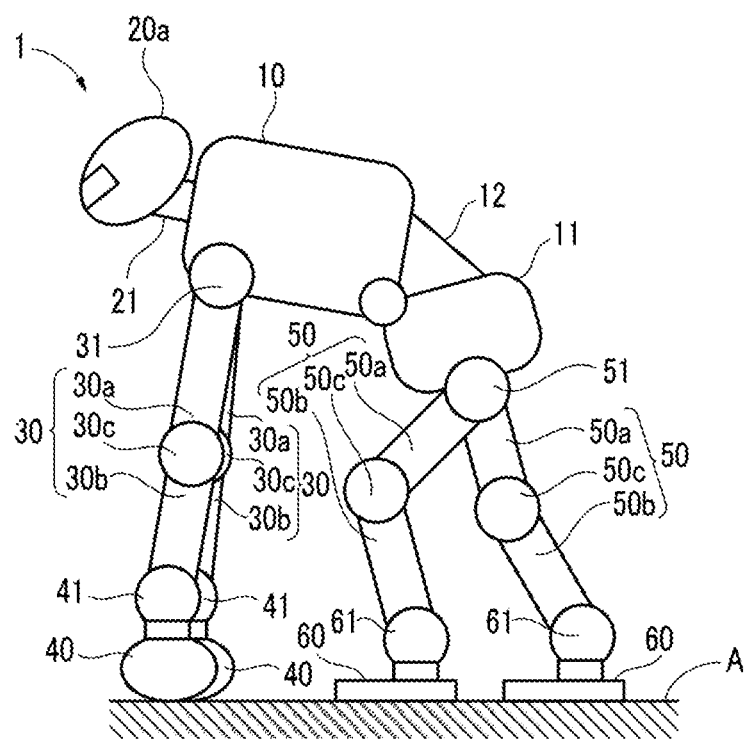
FIG. 4 is a side view illustrating the state in which the robot of FIG. 1 moves in a four-legged walking mode.

As illustrated in FIG. 4, in the four-legged walking mode, the following process is repeated: while two or three of the hands 40 at the tip ends of the arm links 30 and the feet 60 at the tip ends of the leg links 50 are landed on the ground A (two or three of the arm links 30 and the leg links 50 are used as support legs), the remaining two or one of the hands 40 and the feet 60 move in the air and then, are landed (the remaining two or one of the arm links 30 and the leg links 50 operate as idling legs). In this case, at least one of the arm links 30 and the leg links 50 operating as the idling leg is periodically switched under a predetermined rule.

Note that the operation in the four-legged walking mode is not limited to the above-described operation. For example, the following process may be repeated: while one of the hands 40 at the tip ends of the arm links 30 and the feet 60 at the tip ends of the leg links 50 is landed on the ground A (one of the hands 40 and the feet 60 is used as a support leg), the remaining three of the hands 40 and the feet 60 move in the air and then, are landed (the remaining three of the hands 40 and the feet 60 operate as idling legs).

Alternatively, the following process can be repeated: the hands 40 at the tip ends of the arm links 30 and the feet 60 at the tip ends of the leg links 50 move all together in the air (i.e., the robot 1 jumps), and then, are landed.

Next, the environment recognition device 20 of the robot 1 of the present embodiment will be described in detail with reference to FIGS. 5 to 12.

First, the structure of the environment recognition device 20 for external environment recognition will be described with reference to FIGS. 5 to 8.

Figure 5A:
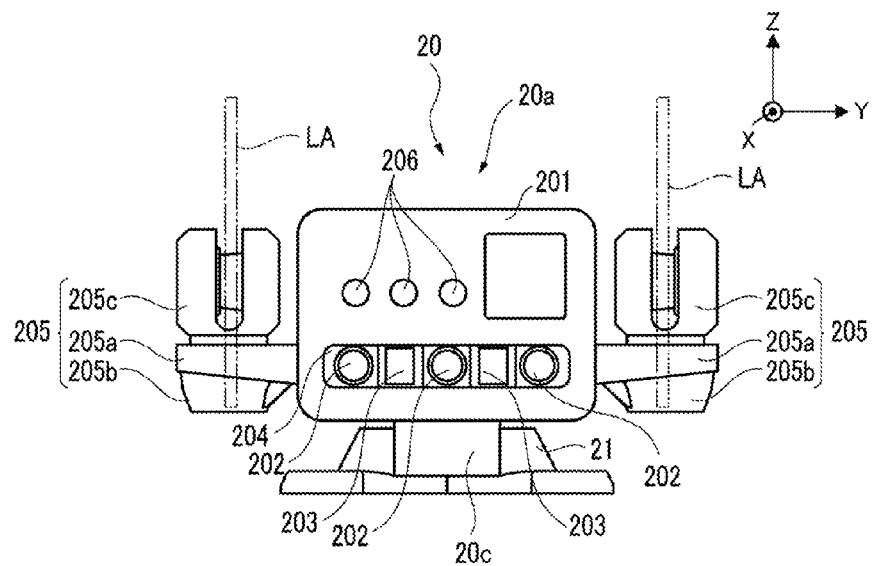
FIGS. 5A and 5B are front views of an environment recognition unit and a neck joint mechanism of the robot of FIG. 1.
Figure 5B:
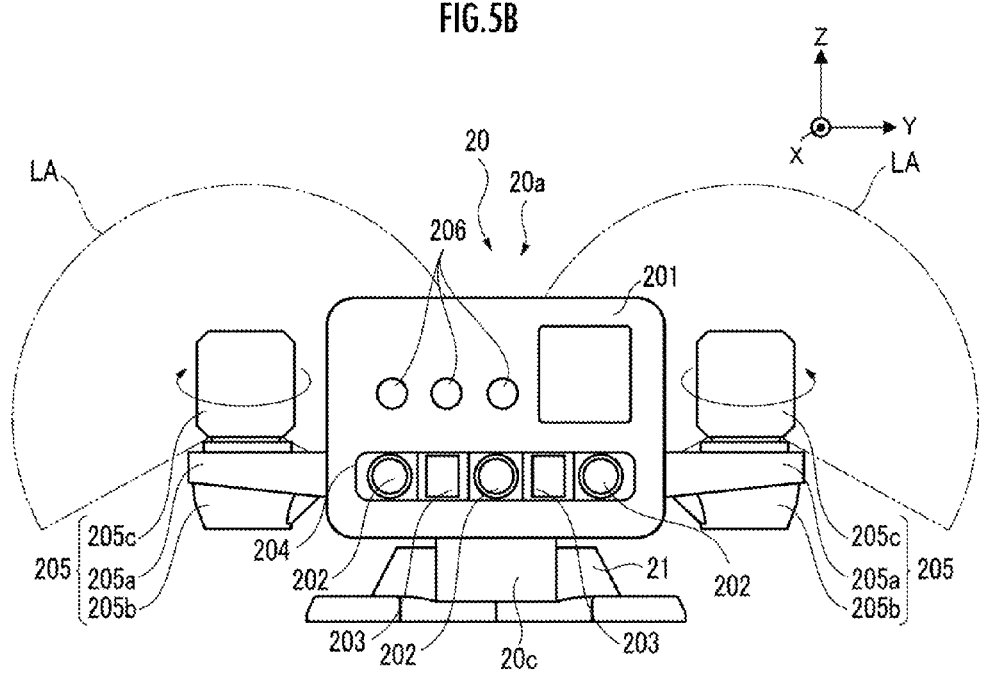

As illustrated in FIGS. 5A and 5B, the environment recognition device 20 includes the environment recognition unit 20a, the environment recognition unit control circuit 20b (not shown in FIGS. 5A and 5B and see FIG. 1) disposed in the upper base 10, and a neck frame 20c extending downward (i.e., toward the upper base 10) from a lower surface of the environment recognition unit 20a. Since the neck frame 20c is rotatably supported by the neck joint mechanism 21, the environment recognition unit 20a is rotatable about the pitch axis (Y-axis) relative to the upper base 10.

The environment recognition unit 20a includes a substantially-rectangular head frame (frame) 201, three cameras 202 arranged in line at the forward side in the head frame 201, two lights (light sources) 203 each disposed between adjacent ones of the cameras 202 and formed of, e.g., an LED, a protective glass 204 fitted into the head frame 201 in the front of the cameras 202 and the lights 203 to protect the cameras 202 and the lights 203, a pair of right and left LRFs (distance sensors) 205 arranged on side of the head frame 201 outside the head frame 201, and a projector 206 disposed above the cameras 202 and the lights 203.

As illustrated in a plan view of FIG. 6A, the environment recognition unit 20a images, using two among three cameras 202, external environment in the forward of the environment recognition unit 20a as an image with depth. Specifically, the cameras 202 performs stereoscopic viewing in the region where an imaging area ImA1 of the right one of three cameras 202 overlaps, as viewed in the plane of paper, with an imaging area ImA2 of the middle one among three cameras 202 and the region where the imaging area ImA2 of the middle camera 202 overlaps with an imaging area ImA3 of the left one among three cameras 202 as viewed in the plane of paper.

As will be seen from the plan view of FIG. 6A and a side view of FIG. 6B, the lights 203 irradiate light to cover, in the horizontal and vertical directions, the region where the cameras 202 perform stereoscopic viewing (i.e., the region where the imaging area ImA1 and the imaging area ImA2 overlap with each other and the region where the imaging area ImA2 and the imaging area ImA3 overlap with each other).

Note that the imaging areas ImA1, ImA2 and illumination areas IlA1, IlA2 described above are set forth as an example to indicate the direction of light irradiation. The distance in the imageable area of the camera 202 and the illuminable area of the light 203 can be longer beyond the imaging areas ImA1, ImA2 and the illumination areas IlA1, IlA2 depending on performance of the cameras 202 and the lights 203.

Moreover, as illustrated in FIGS. 5A and 5B, the environment recognition unit 20a includes the projector 206 at the position above the cameras 202 and the lights 203 in the forward side of the head frame 201.

The projector 206 projects a predetermined pattern (e.g., a grid pattern) on external environment in the front of the head frame 201. The environment recognition device 20 images, using the cameras 202, the projected pattern to recognize the three-dimensional shape of the external environment. Since the projector 206 is disposed above the cameras 202, the projector 206 can project a pattern farther as compared to the case of disposing the projector 206 in the same line as the cameras 202 or below the cameras 202.

Note that the camera 202, the light 203, and the projector 206 described above are set forth as an example. The camera in the present invention is not limited to such a camera as long as a camera can recognize external environment in the front of the robot 1. For example, an infrared sensor may be used.

Moreover, in the present embodiment, each light 203 serving as the light source is configured such that an irradiator configured to actually irradiate light is integrated with a light emitter and a control circuit requiring heat discharging. The lights 203 are arranged adjacent to the front side of a later-described cooling mechanism in the forward side in the head frame 201.

However, in the case of using light sources having different structures (e.g., a light source using an optical fiber or a prism to connect a light emitter and a control circuit to an irradiator), only the light emitter or the control circuit requiring heat discharging may be disposed adjacent to a cooling mechanism. In this case, the light emitter or the control circuit may be disposed behind or lateral sides of the cooling mechanism.

In the environment recognition unit 20a, the LRFs 205 recognize external environment lateral to the environment recognition unit 20a. The LRF (laser range finder) described herein is configured to measure the time until an irradiated laser beam is reflected by external environment and returns to the LRF to measure the distance to the external environment based on the measured time.

In the description made below, an example of a laser beam irradiation area is indicated as a laser beam irradiation area LA. Note, however, that such an area will be set forth as an example of the direction of laser beam irradiation, and the distance in the measurable area of the LRF 205 can be longer than the laser beam irradiation area LA depending on, e.g., the strength of a laser beam.

Each LRF 205 includes a support 205a extending laterally from the head frame 201, a driver 205b attached to a lower portion of a tip end portion of the support 205a, and a measurer 205c rotatably attached to an upper portion of the tip end portion of the support 205a.

The driver 205b is formed of, e.g., a drive source such as an actuator or a reducer, and the drive force thereof rotates the measurer 205c about the yaw axis (Z-axis) (see FIGS. 5B and 7A to 7C).

The measurer 205c is configured to irradiate a laser beam and to receive a reflected laser beam.

Figure 7A:
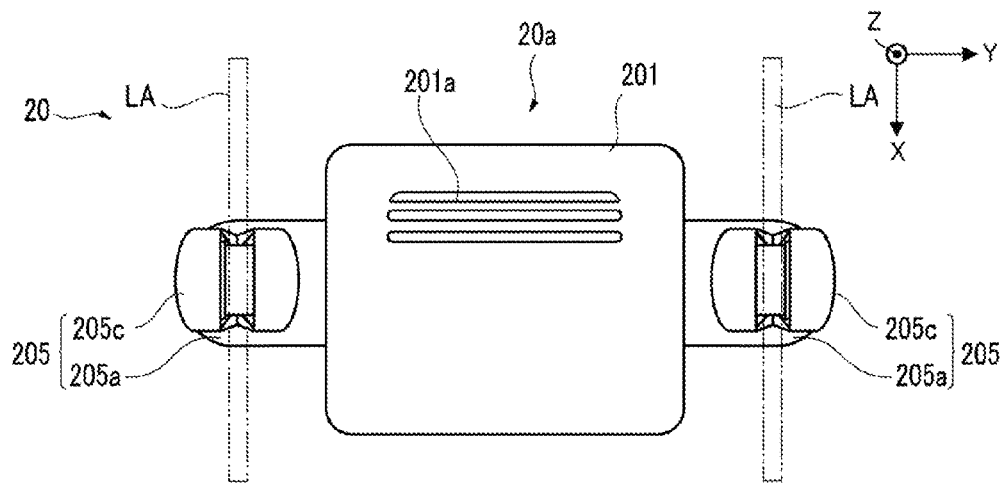
FIGS. 7A to 7C are plan views of the environment recognition unit and the neck joint mechanism of the robot of FIG. 1.

As illustrated in FIG. 7A, when the measurers 205c of the LRFs 205 do not rotate, the laser beam irradiation areas LA of the measurers 205c extend parallel to the front-back direction of the head frame 201 (i.e., an X-axis direction) in the vertical direction of the environment recognition unit 20a.

Figure 7B:
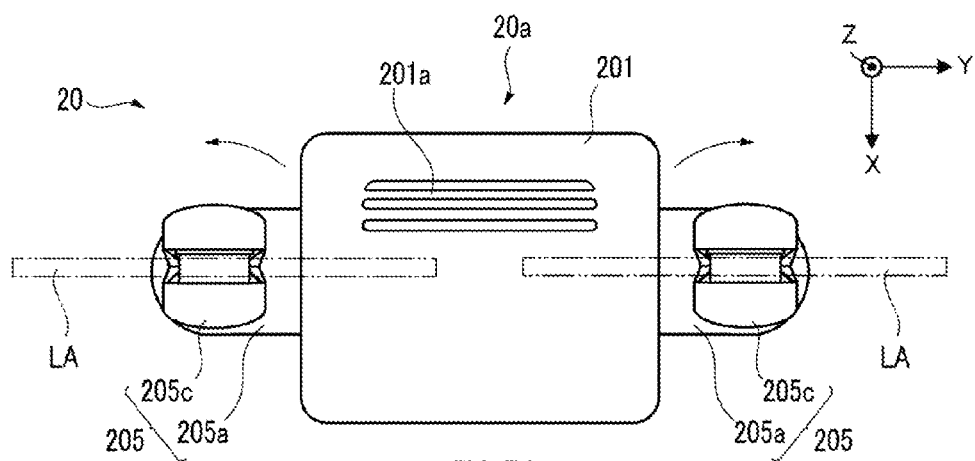

Moreover, the LRFs 205 can rotate the measurers 205c backward (i.e., rotates the left measurer 205c counterclockwise as viewed in the plane of paper, and rotates the right measurer 205c clockwise as viewed in the plane of paper) as illustrated in FIG. 7B. Conversely, as illustrated in FIG. 7C, the LRFs 205 can rotate the measurers 205c forward (i.e., rotates the left measurer 205c clockwise as viewed in the plane of paper, and rotates the right measurer 205c counter-clockwise as viewed in the plane of paper).

Figure 7C:
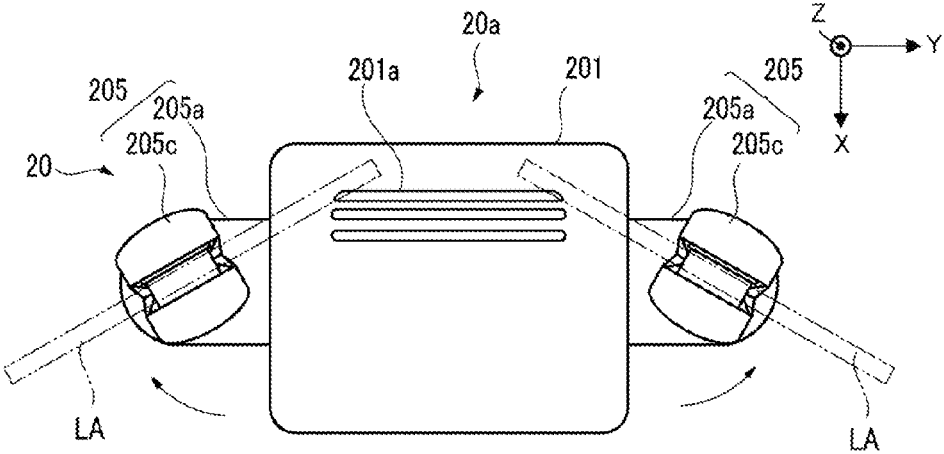

Note that the angle of rotation of the measurer 205c as described above and the angle of rotation of the measurer 205c as illustrated in FIGS. 7A to 7C have been set forth as an example of the state in the middle of rotation, and the right and left measurers 205c are configured to rotate to an angle sufficient for recognition of ambient environment. Moreover, only one of the right and left measurers 205c can rotate independently.

As illustrated in FIGS. 8A to 8C, the environment recognition unit 20a is, by the neck joint mechanism 21, coupled to rotate about the pitch axis (Y-axis) relative to the upper base 10. Specifically, the environment recognition unit 20a can be changed from the state of the reference posture as illustrated in the FIG. 8A to the state in which the environment recognition unit 20a is bent forward as illustrated in FIG. 8B (i.e., the state corresponding to the state in which a human looks down to see the foot) or to the state in which the environment recognition unit 20a is bent backward as illustrated in FIG. 8C (i.e., the state corresponding to the state in which a human looks up).

The recognizable area of each LRF 205 (i.e., the center angle of the fan shape indicated as the laser irradiation area LA) is about 270° about the Y-axis at the center of the measurer 205c.

Thus, each LRF 205 rotates about the yaw axis (Z-axis) (see FIGS. 7A to 7C) in the environment recognition unit 20a, and the environment recognition unit 20a rotates about the pitch axis (Y-axis) (see FIGS. 8A to 8C). In this manner, external environment at the substantially entire periphery of the environment recognition unit 20a can be recognized by the LRFs 205.

The robot 1 of the present embodiment includes, as described above, the LRFs 205 and the cameras 202 performing stereoscopic viewing for the front of the robot 1. Thus, as compared to a conventional robot including an environment recognition unit configured to recognize only the front of the robot, environment in a working area and a peripheral area can be sufficiently recognized without great movement of the environment recognition unit.

That is, in the robot 1 of the present embodiment, a rotary shaft and a drive mechanism of the environment recognition unit 20a can be downsized as compared to those of the conventional robot. As a result, high waterproofing can be realized by narrowing of a clearance among the rotary shaft, the drive mechanism, and the base.

Further, in the robot 1 of the present embodiment, the environment recognition unit 20a is configured to rotate only about the pitch axis (Y-axis) via the neck joint mechanism 21 disposed above the upper base 10 (i.e., the environment recognition unit 20a is configured such that no yaw axis (Z-axis) is directly provided for the upper base 10). Thus, no water enters the upper base 10 along the axis.

In addition, the robot 1 of the present embodiment can switch between the two-legged walking mode and the four-legged walking mode. Thus, the surface positioned on the upper side of the robot in the two-legged walking mode is on the front side of the robot in the four-legged walking mode. However, the robot 1 is configured such that the environment recognition unit 20*a* is rotatable about the pitch axis (i.e., in any mode, the rotation axis is parallel to the surface of the upper base 10), and therefore, no water enters the upper base 10 along the axis.

Next, a cooling device of the environment recognition unit 20*a* will be described with reference to FIGS. 9 to 11.

Figure 9:
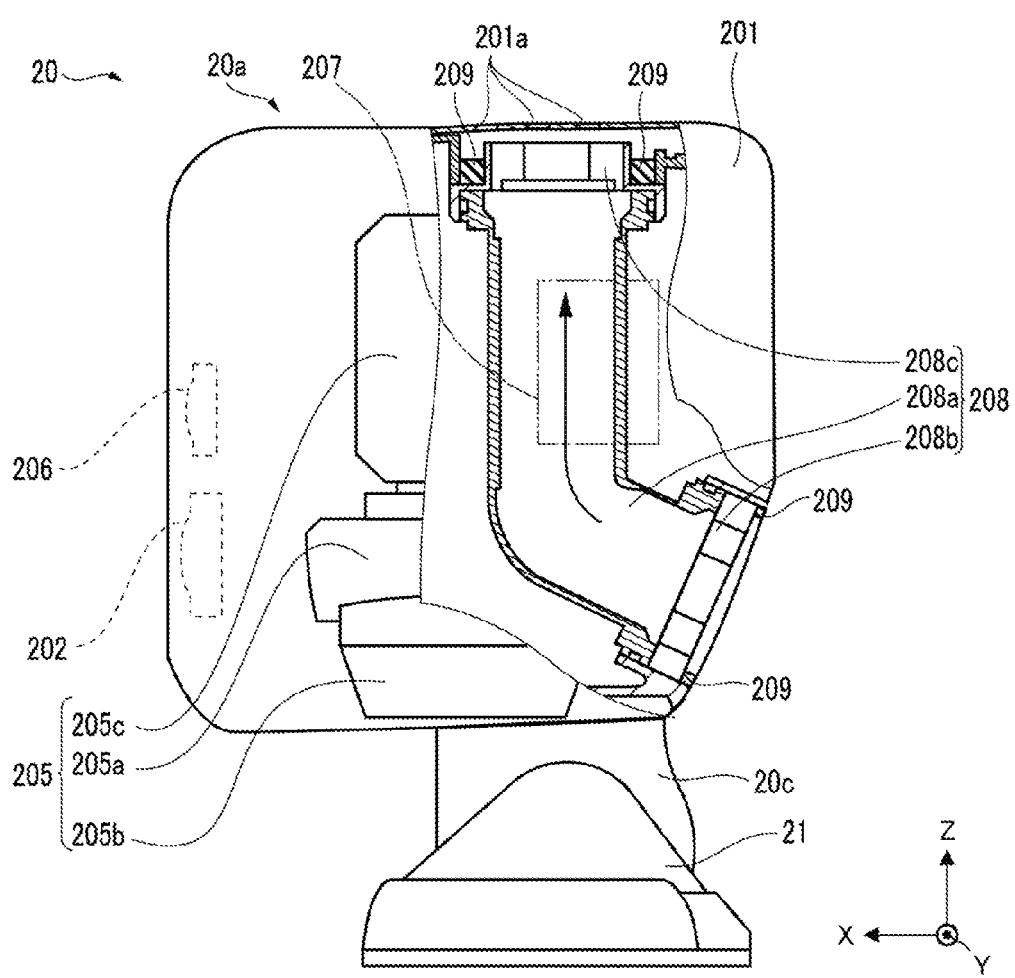
FIG. 9 is a side cross-sectional view illustrating the periphery of a first duct of the environment recognition unit of the robot of FIG. 1.

As illustrated in FIG. 9, the environment recognition unit 20*a* includes, in the head frame 201, a camera control circuit (control circuit) 207 disposed in the backward of the cameras 202 and the projector 206, and a first duct (first cooling mechanism) 208 provided adjacent to the camera control circuit 207. The camera control circuit 207 is a member configured to control the cameras 202 serving as cameras of the present invention and the projector 206.

Figure 10:
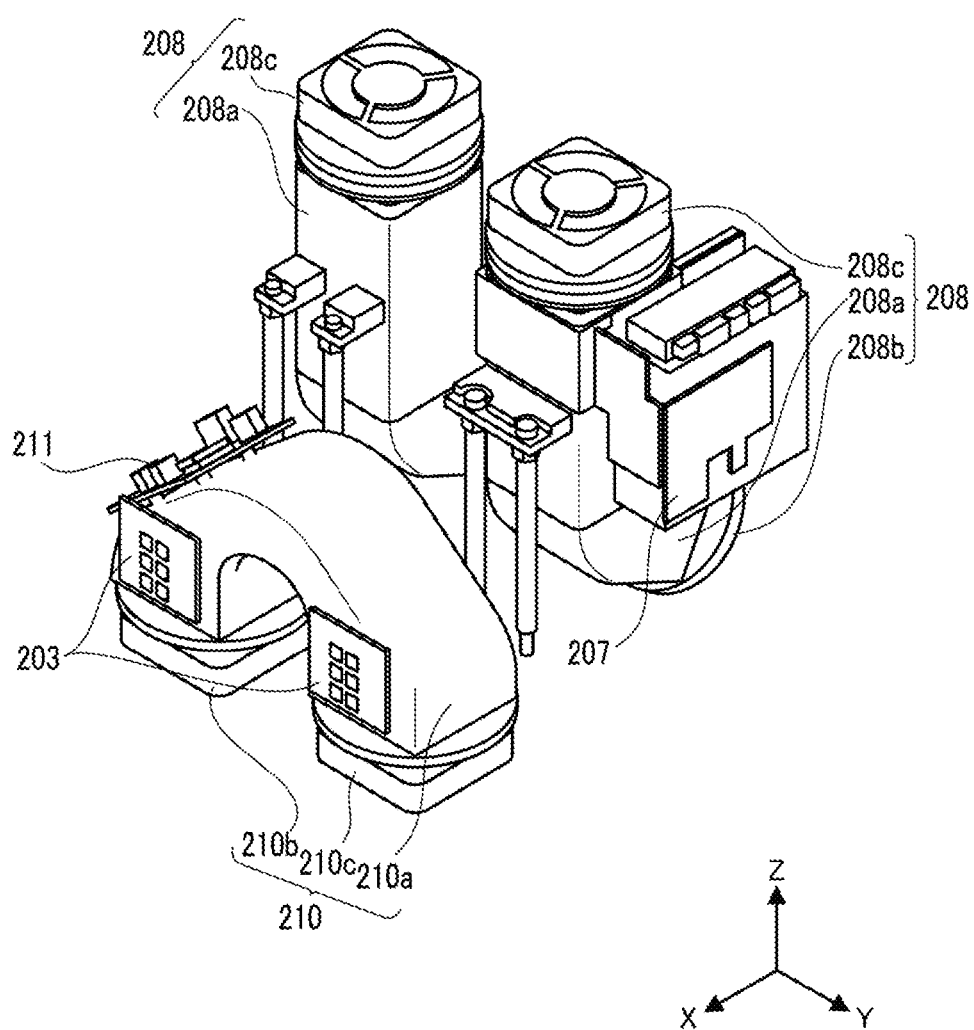
FIG. 10 is a perspective view illustrating first and second ducts of the environment recognition unit of the robot of FIG. 1.

As illustrated in FIG. 10, the camera control circuit 207 has a relatively-large size, and the heat generation amount thereof is great. Thus, the camera control circuit 207 is disposed on the back side in the head frame 201, the back side having an extra room for installation and being apart from the cameras 202 and the projector 206.

The first duct 208 includes a cylindrical first duct portion 208*a* having a rectangular cross section, a first introduction fan 208*b* attached to an opening formed at one end of the first duct portion 208*a*, and a first discharge fan 208*c* attached to an opening at the other end of the first duct portion 208*a*.

The camera control circuit 207 is disposed adjacent to the first duct portion 208*a*. Thus, the camera control circuit 207 is sufficiently cooled by air passing through the first duct portion 208*a*.

Moreover, as illustrated in FIG. 9, the first introduction fan 208*b* is positioned on the lower back side of the head frame 201 to guide air from the back of the environment recognition unit 20*a* to the inside of the first duct portion 208*a*. The first discharge fan 208*c* is positioned below a slit 201*a* formed at the upper surface of the head frame 201 to discharge air upward from the environment recognition unit 20*a* (see an arrow in FIG. 9). Thus, it is difficult for water to flow into the first duct portion 208*a*.

Note that a first duct waterproof ring (sealing mechanism) 209 formed of a rubber O-ring is disposed between the head frame 201 and the first introduction fan 208*b* and between the head frame 201 and the first discharge fan 208*c*. The first duct waterproof ring 209 prevents water from entering the head frame 201 through a clearance between the head frame 201 and the first duct 208.

Figure 11:
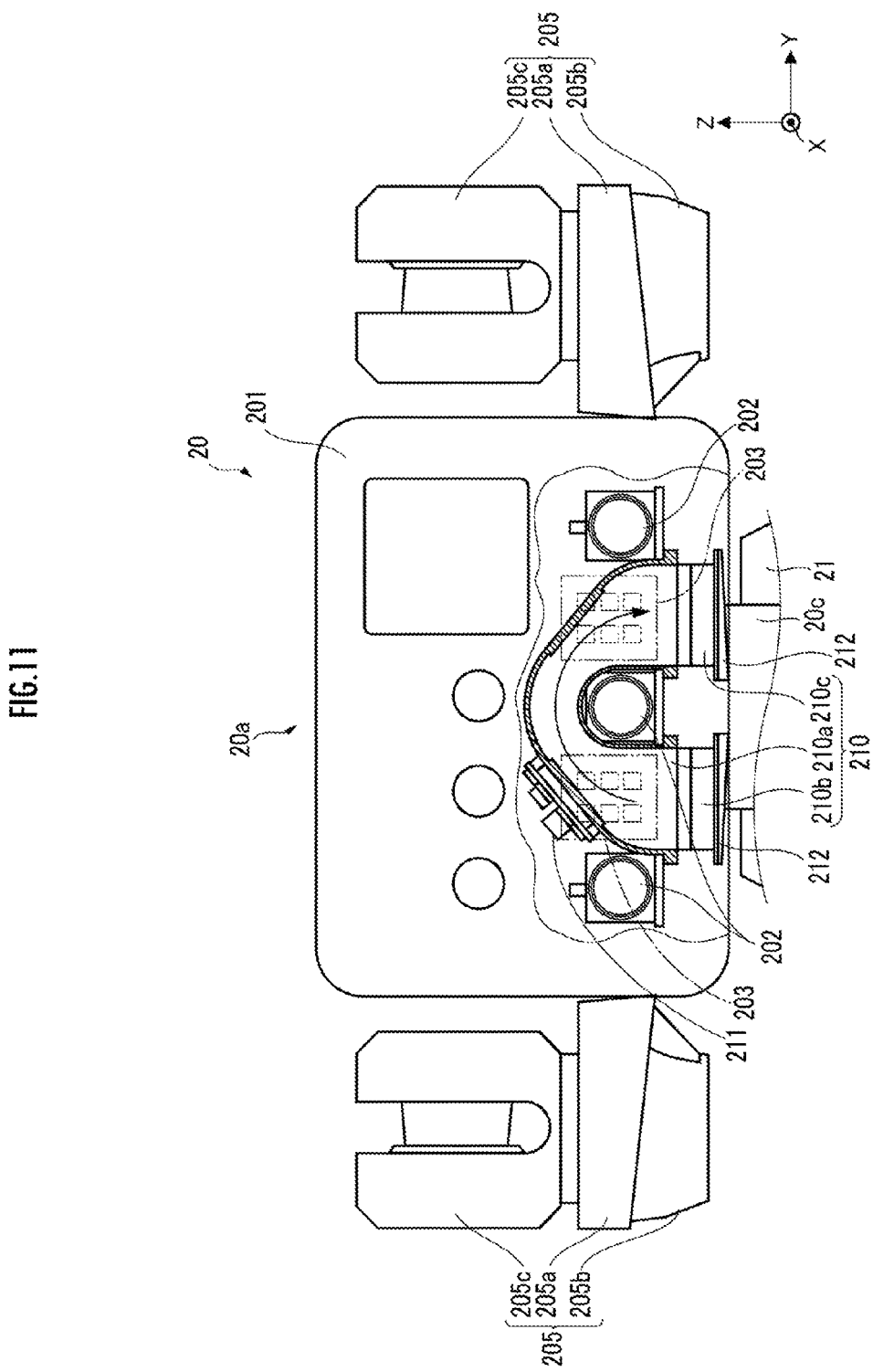
FIG. 11 is a front cross-sectional view illustrating the periphery of the second duct of a head of the robot of FIG. 1.

As illustrated in FIG. 11, the environment recognition unit 20*a* includes, on the front side in the head frame 201, a second duct (second cooling mechanism) 210 disposed adjacent to the cameras 202 and the lights 203. Moreover, a light control circuit 211 configured to control the lights 203 is also disposed adjacent to the second duct 210.

The second duct 210 includes a cylindrical second duct portion 210*a* having a rectangular cross section, a second introduction fan 210*b* attached to an opening formed at one end (on the left side as viewed in the plane of paper) of the second duct portion 210*a*, and a second discharge fan 210*c* attached to an opening at the other end (on the right side as viewed in the plane of paper) of the second duct portion 210*a*.

The second duct portion 210*a* is curved to surround the middle one of the three cameras 202 arranged in line, and is disposed such that both end openings thereof face downward of the head frame 201.

Moreover, as illustrated in FIG. 10, the lights 203 are attached to the side surface of the second duct portion 210*a* on the front side of the head frame 201. The light control circuit 211 is attached to the side surface of the second duct portion 210*a* on the upper side of the head frame 201.

Since the cameras 202, the lights 203, and the light control circuit 211 are arranged adjacent to the second duct portion 210*a*, the cameras 202, the lights 203, and the light control circuit 211 are sufficiently cooled by air passing through the inside of the second duct portion 210*a*.

Further, as illustrated in FIG. 11, the second introduction fan 210*b* is positioned on the lower side of the head frame 201 to guide air from the lower front side of the environment recognition unit 20*a* to the inside of the second duct portion 210*a*. The second discharge fan 210*c* is positioned next to the second introduction fan 210*b* on the lower side of the head frame 201 to discharge air from the inside of the second duct portion 210*a* to the lower front side of the environment recognition unit 20*a* (see an arrow in FIG. 11).

Thus, it is difficult for water to flow into the second duct portion 210*a*. Moreover, the installation position of the light control circuit 211 whose heat generation amount is great is on an upstream side (the region with a high cooling performance) in the flow of air in the second duct portion 210*a*.

Note that a second duct waterproof ring (sealing mechanism) 212 formed of a rubber O-ring is disposed between the head frame 201 and the second introduction fan 210*b* and between the head frame 201 and the second discharge fan 210*c*. The second duct waterproof ring 212 prevents water from entering the head frame 201 through a clearance between the head frame 201 and the second duct 210.

Figure 12:
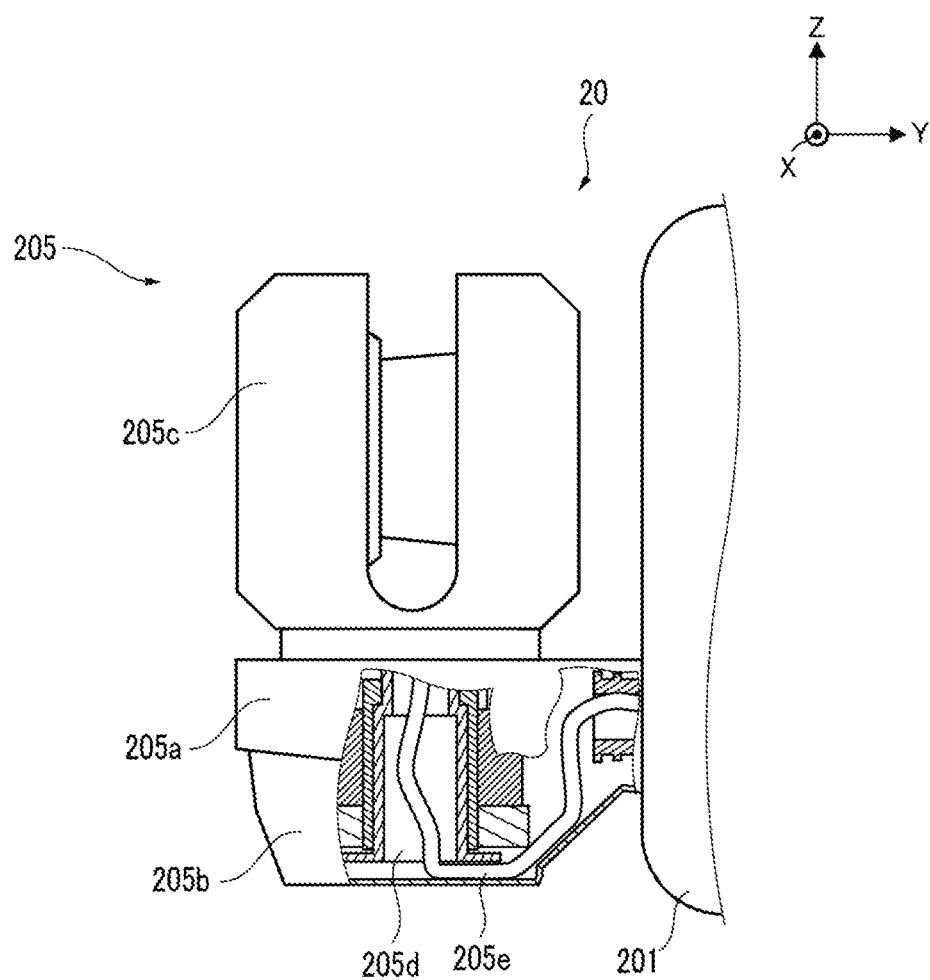
FIG. 12 is a front cross-sectional view illustrating part of the structure of a distance sensor of the robot of FIG. 1.

As illustrated in FIG. 12, each LRF 205 includes the support 205*a* extending laterally from the head frame 201, the driver 205*b* attached to the lower portion of the tip end portion of the support 205*a*, and the measurer 205*c* rotatably attached to the upper portion of the tip end portion of the support 205*a*.

A communication path 205*d* is formed in the support 205*a* and the driver 205*b*. A distance sensor harness 205*e* is inserted into the communication path 205*d*, and the distance sensor harness 205*e* electrically connects the driver 205*b* and the measurer 205*c* to a distance sensor control circuit (not shown) disposed in the head frame 201.

Since the communication path 205*d* is formed in the support 205*a*, a hole opening on the side close to the head frame 201 is along the horizontal direction. This prevents water from entering the head frame 201 through the opening.

Note that in the present embodiment, the driver 205*b* is disposed below the support 205*a*, and the measurer 205*c* is disposed above the support 205*a*. However, the driver 205*b* may be disposed above the support 205*a*, and the measurer 205*c* may be disposed below the support 205*a*.

The robot 1 of the present embodiment employs the first duct 208 and the second duct 210 separately arranged apart from each other in order to cool the cameras 202, the projector 206, and the camera control circuit 207 configured to control the cameras 202 and the projector 206.

Thus, the environment recognition unit 20*a* has higher waterproofing as compared to a unit employing a cooling method using air passing through a clearance in the head frame 201, and has a compact structure with a higher degree of freedom in arrangement of internal equipment as compared to a unit employing a cooling device such as a water-cooling mechanism.

Consequently, the environment recognition unit 20*a* of the environment recognition device 20 of the robot 1 of the present embodiment is compact while exhibiting a satisfactory cooling function and high waterproofing.

The embodiment illustrated in the figures has been described above, but the present invention is not limited to such an embodiment.

For example, in the above-described embodiment, the first duct 208 and the second duct 210 are used as the cooling mechanisms. However, the cooling mechanism of the present invention is not limited to such a configuration as long as the cooling mechanism can be disposed in the inner space of the frame. For example, a radiator and a pipe which is connected to the radiator and through which liquid flows may form the cooling mechanism.

Further, in the above-described embodiment, the following components are provided: three cameras 202 arranged in line; the lights 203 each disposed between adjacent ones of the cameras 202; the pair of right and left LRFs 205; and the projector 206 disposed above the cameras 202, the lights 203, and the LRFs 205.

However, the environment recognition unit of the present invention is not limited to such a configuration. For example, another camera than the above-described camera and another distance sensor than the LRF may be used. Moreover, only a single camera may be disposed, or the light source and/or the projector may be omitted.

In addition, in the above-described embodiment, the openings of the first duct portion 208a of the first duct 208 are positioned respectively on the upper side and the lower back side of the environment recognition unit 20a. Further, the openings of the second duct portion 210a of the second duct 210 are positioned on the lower front side of the environment recognition unit. However, the present invention is not limited to such a configuration, and these openings may be positioned to face in other directions.

Moreover, in the above-described embodiment, the first duct waterproof ring 209 formed of the rubber O-ring as the sealing mechanism is disposed between the head frame 201 and the first duct 208, and the second duct waterproof ring 212 formed of the rubber O-ring as the sealing mechanism is disposed between the head frame 201 and the second duct 210.

However, the present invention is not limited to such a configuration, and the sealing mechanism may be omitted. In the case of omitting the sealing mechanism, it is preferred that the head frame and the first and second ducts are integrally configured. Moreover, the sealing mechanism may be, other than the rubber O-ring, configured using, e.g., bonding with an adhesive, swaging, pressure-fitting, or screwing.

In addition, in the above-described embodiment, the neck joint mechanism 21 is coupled such that the environment recognition unit 20a is rotatable about the pitch axis.

However, the present invention is not limited to such a configuration as long as the coupling mechanism is attached to the upper portion of the base and couples the environment recognition unit to the base such that the environment recognition unit is rotatable about the axis parallel to the surface of the base close to the environment recognition unit. That is, the environment recognition unit may be coupled to rotate about the roll axis.

Further, in the above-described embodiment, in the first duct 208, air is introduced from the lower back side of the environment recognition unit 20a, and then, is discharged upward. Moreover, in the second duct 210, air is introduced from the lower left side of the environment recognition unit 20a as viewed in the plane of paper, and then, is discharged to the lower right side of the environment recognition unit 20a as viewed in the plane of paper.

However, the first and second ducts of the present invention are not limited to such ducts. A duct may be configured such that air passes from the top to the bottom or that air passes from the right to the left.

REFERENCE SIGNS LIST 1 robot
10 upper base
11 lower base
12 waist joint mechanism
12a first waist joint mechanism
12b second waist joint mechanism
20 environment recognition device
20a environment recognition unit
20c neck frame
20b environment recognition unit control circuit
21 neck joint mechanism (coupling mechanism)
30 arm link (movable link)
30a first arm link portion
30b second arm link portion
30c elbow joint mechanism
31 shoulder joint mechanism
31a, 31d first shoulder joint mechanism
31b second shoulder joint mechanism
31c third shoulder joint mechanism
40 hand
41 wrist joint mechanism
41a first wrist joint mechanism
41b second wrist joint mechanism
50 leg link (movable link)
50a first leg link portion
50b second leg link portion
50c knee joint mechanism
51 hip joint mechanism
51a first hip joint mechanism
51b second hip joint mechanism
60 foot
61 ankle joint mechanism
201 head frame (frame)
201a slit
202 camera
203 light (light source)
204 protective glass
205 LRF (distance sensor)
205a support
205b driver
205c measurer
205d communication path
205e distance sensor harness
206 projector
207 camera control circuit (control circuit)
208 first duct (first cooling mechanism)
208a first duct portion
208b first introduction fan
208c first discharge fan
209 first duct waterproof ring (sealing mechanism)
210 second duct (second cooling mechanism)
210a second duct portion
210b second introduction fan
210c second discharge fan
211 light control circuit
212 second duct waterproof ring (sealing mechanism)
IlA1, IlA2 illumination area
ImA1, ImA2, ImA3 imaging area
LA laser beam irradiation area
A ground

What is claimed is:

1. An environment recognition unit comprising:
   a frame;
   a camera disposed at a forward side in the frame and configured to capture an image in a forward direction from the frame;
   a control circuit disposed at a backward side in the frame, at a position backward from the camera, and configured to control the camera;
   a pair of distance sensors arranged at sides of the frame;
   a first cooling mechanism provided adjacent to the control circuit at the backward side in the frame; and
   a second cooling mechanism provided adjacent to the camera at the forward side in the frame.

2. The environment recognition unit of claim 1, further comprising:
   a light source configured to illuminate in the forward direction from the frame,
   wherein the light source is disposed adjacent to the second cooling mechanism at a position a forward of the second cooling mechanism in the frame.

3. The environment recognition unit of claim 1, wherein
   one of the first cooling mechanism and the second cooling mechanism is a duct, and
   at least one opening of the duct is positioned on a lower side or the back side in the frame.

4. The environment recognition unit of claim 1, wherein
   one of the first cooling mechanism and the second cooling mechanism is a duct, and
   a sealing mechanism is attached between an opening of the duct and the frame.

5. The environment recognition unit of claim 1, further comprising:
   a distance sensor control circuit disposed in the frame and configured to control operation of the distance sensors,
   wherein each of the distance sensors includes
      a hollow support extending laterally from the frame,
      a driver attached to a lower or upper portion of a tip end portion of the support,
      a measurer attached to a portion of the support opposite to the driver to rotate about a yaw axis, and
      a distance sensor harness electrically connecting the driver or the measurer to the distance sensor control circuit, and
   the distance sensor harness extends into the frame through an inside of the support.

6. A robot comprising:
   a base;
   an environment recognition unit; and
   a coupling mechanism configured to rotatably couple the environment recognition unit to the base,
   wherein the environment recognition unit includes
      a frame,
      a camera disposed at a forward side in the frame and configured to capture an image in a forward direction from the frame,
      a control circuit disposed at a backward side in the frame, at a position backward from the camera, and configured to control the camera,
      a pair of distance sensors arranged at sides of the frame,
      a first cooling mechanism provided adjacent to the control circuit at the backward side in the frame, and
      a second cooling mechanism provided adjacent to the camera at the forward side in the frame.

7. The robot of claim 6, wherein
   the environment recognition unit is disposed above the base, and
   the coupling mechanism couples the environment recognition unit and the base such that the environment recognition unit is configured to rotate about a pitch axis or a roll axis relative to the base.

8. The robot of claim 6, further comprising:
   a plurality of movable links; and
   a plurality of joint mechanisms each coupled such that a corresponding one of the movable links is configured to rotate relative to the base,
   wherein the plurality of movable links include a pair of right and left arm links provided at an upper portion of the base, and a pair of right and left leg links provided at a lower portion of the base,
   the robot is switchable between a two-legged walking mode using only the leg links or the arm links and a four-legged walking mode using the leg links and the arm links, and
   the coupling mechanism couples the environment recognition unit and the base such that the environment recognition unit is configured to rotate about a pitch axis or a roll axis relative to the base.

9. The environment recognition unit of claim 1, wherein
   the first cooling mechanism is one of a duct and a radiator; and
   the second cooling mechanism is one of a duct and a radiator.

10. The robot of claim 6, wherein
    the first cooling mechanism is one of a duct and a radiator; and
    the second cooling mechanism is one of a duct and a radiator.

* * * * *